(12) United States Patent
Saito et al.

(10) Patent No.: US 12,400,247 B2
(45) Date of Patent: Aug. 26, 2025

(54) REPRESENTING SETS OF ENTITIES FOR MATCHING PROBLEMS

(71) Applicant: SAP SE, Walldorf (DE)

(72) Inventors: Sean Saito, Singapore (SG); Truc Viet Le, Singapore (SG); Chaitanya Joshi, Singapore (SG); Rajalingappaa Shanmugamani, Singapore (SG)

(73) Assignee: SAP SE, Walldorf (DE)

( * ) Notice: Subject to any disclaimer, the term of this patent is extended or adjusted under 35 U.S.C. 154(b) by 534 days.

(21) Appl. No.: 16/208,681

(22) Filed: Dec. 4, 2018

(65) Prior Publication Data
US 2020/0175559 A1    Jun. 4, 2020

(51) Int. Cl.
| | | |
|---|---|---|
| *G06Q 20/20* | (2012.01) | |
| *G01C 21/34* | (2006.01) | |
| *G01C 21/36* | (2006.01) | |
| *G06F 16/22* | (2019.01) | |
| *G06F 16/2455* | (2019.01) | |
| *G06N 7/01* | (2023.01) | |
| *G06N 20/00* | (2019.01) | |
| *G06Q 30/04* | (2012.01) | |
| *G06Q 40/02* | (2023.01) | |

(52) U.S. Cl.
CPC .......... *G06Q 30/04* (2013.01); *G06F 16/221* (2019.01); *G06F 16/2456* (2019.01); *G06N 7/01* (2023.01); *G06N 20/00* (2019.01); *G06Q 40/02* (2013.01)

(58) Field of Classification Search
CPC ........ G06Q 30/04; G06Q 40/02; G06N 20/00; G06N 7/005; G06N 3/08; G06F 16/2456; G06F 16/221
See application file for complete search history.

(56) References Cited

U.S. PATENT DOCUMENTS

| | | |
|---|---|---|
| 8,229,883 B2 | 7/2012 | Brauer et al. |
| 8,626,653 B1 | 1/2014 | Krikorian et al. |
| 9,679,259 B1 | 6/2017 | Frind et al. |
| 9,898,515 B1 * | 2/2018 | Avagyan ............... G06F 16/254 |
| 2005/0075960 A1 | 4/2005 | Leavitt et al. |

(Continued)

OTHER PUBLICATIONS

Cloud Factory TV (MYOB Advanced General Ledger, https://www.youtube.com/watch?v=0uHU8agiACc, Apr. 10, 2018) (Year: 2018).*

*Primary Examiner* — Michael Jared Walker
*Assistant Examiner* — Matthew S Weronski
(74) *Attorney, Agent, or Firm* — Fish & Richardson P.C.

(57) ABSTRACT

Methods, systems, and computer-readable storage media for providing a set of column pairs, each column pair including a column of a bank statement table, and a column of a super invoice table, each column pair corresponding to a modality, the super invoice table including at least one row including data associated with multiple invoices, for each column pair, determining a feature descriptor based on an operator, a feature vector being provided based on feature descriptors of the set of column pairs, inputting the feature vector to a ML model that processes the feature vector to determine a probability of a match between the bank statement, and a super invoice represented by the super invoice table, and outputting a binary output representing one of a match and no match between the bank statement, and the super invoice based on the probability.

20 Claims, 6 Drawing Sheets

| Invoice Table | | | | | |
|---|---|---|---|---|---|
| ID | Amount | Customer | Creation Date | Due Date | |
| A | 30.00 | DEF | 2018/05/04 | 2018/06/22 | |
| B | 40.00 | GHI | 2018/03/23 | 2018/06/28 | |
| C | 70.00 | JKL | 2018/06/01 | 2018/06/15 | |

⌐ 300

| Super Invoice Table | | | | | |
|---|---|---|---|---|---|
| ID | Amount | Total | Customer | Creation Date | Due Date |
| [A, B] | [30.00, 40.00] | 70.00 | [DEF, GHI] | [2018/05/04, 2018/03/23] | [2018/06/22, 2018/06/28] |
| [C] | [70.00] | 70.00 | [JKL] | [2018/06/01] | [2018/06/15] |

⌐ 302

(56) References Cited

U.S. PATENT DOCUMENTS

| | | | |
|---|---|---|---|
| 2007/0165801 A1* | 7/2007 | Devolites | H04M 15/00 |
| | | | 379/114.03 |
| 2009/0138277 A1 | 5/2009 | Warren et al. | |
| 2010/0100561 A1* | 4/2010 | Cooper | G06Q 10/103 |
| | | | 707/769 |
| 2013/0317940 A1 | 11/2013 | Fitz | |
| 2014/0108461 A1* | 4/2014 | B'Far | G06F 16/211 |
| | | | 707/794 |
| 2017/0103455 A1 | 4/2017 | Schroeder et al. | |
| 2017/0293951 A1 | 10/2017 | Nolan et al. | |
| 2018/0144314 A1 | 5/2018 | Miller | |
| 2018/0218438 A1 | 8/2018 | Schroeder et al. | |
| 2018/0247227 A1* | 8/2018 | Holtham | G06N 7/01 |
| 2018/0308090 A1* | 10/2018 | Leavitt | G06Q 20/40 |
| 2020/0012980 A1* | 1/2020 | Li | G06Q 10/06313 |

\* cited by examiner

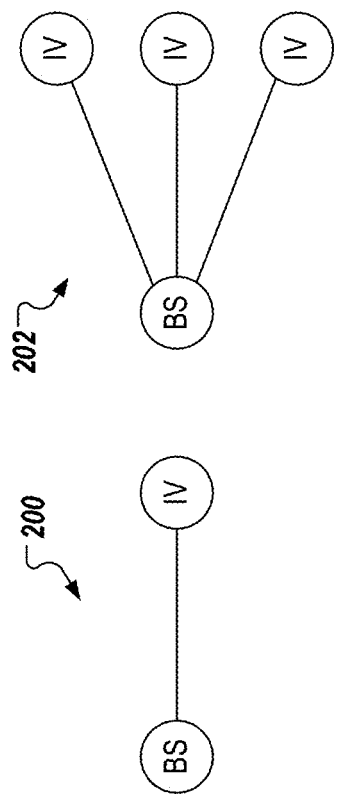
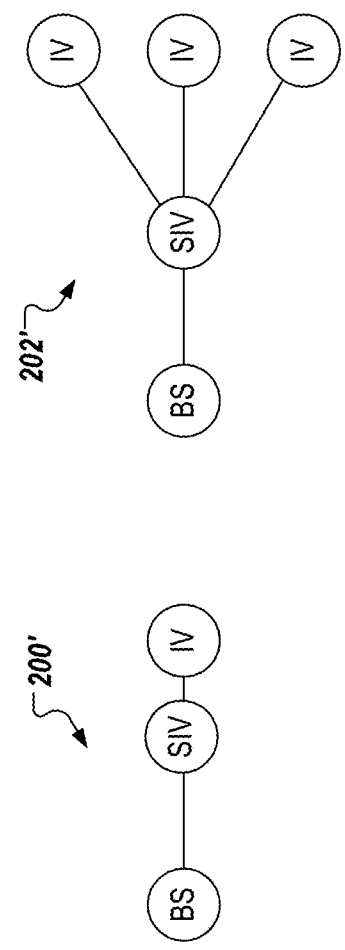
FIG. 2A
FIG. 2B

Invoice Table (300)

| ID | Amount | Customer | Creation Date | Due Date |
|---|---|---|---|---|
| A | 30.00 | DEF | 2018/05/04 | 2018/06/22 |
| B | 40.00 | GHI | 2018/03/23 | 2018/06/28 |
| C | 70.00 | JKL | 2018/06/01 | 2018/06/15 |

Super Invoice Table (302)

| ID | Amount | Total | Customer | Creation Date | Due Date |
|---|---|---|---|---|---|
| [A, B] | [30.00, 40.00] | 70.00 | [DEF, GHI] | [2018/05/04, 2018/03/23] | [2018/06/22, 2018/06/28] |
| [C] | [70.00] | 70.00 | [JKL] | [2018/06/01] | [2018/06/15] |

*FIG. 3A*

| BS Column | SIV Column | Operator | f(b, s) | a(f(b, s)) |
|---|---|---|---|---|
| Memo-line | Reference Number | AVG-CONTAINS | | |
| "Payment for ABC, DEF, GH*" | [ABC, DEF, GHI] | | [1.0, 1.0, 0.0] | 0.67 |

*FIG. 3B*

REPRESENTING SETS OF ENTITIES FOR MATCHING PROBLEMS

BACKGROUND

In general, machine learning includes training a machine learning (ML) model that receives input, and provides some output. Machine learning can be used in a variety of problem spaces. An example problem space includes matching items of one entity to items of another entity. Examples include, without limitation, matching questions to answers, people to products, and bank statements to invoices. In many situations, it is required to match an item from one entity to a set of items from another. For example, it is possible for a customer to clear multiple invoices with a single payment, which can be referred to as a multi-match (many-to-one), as opposed to a single-match (one-to-one). In many domains, existing approaches involve using a set of heuristics to group entities that are matched to a single entity. However, maintaining a set of heuristics can be unscalable when, for example, the patterns for matching items are numerous and variable.

SUMMARY

Implementations of the present disclosure are directed to matching electronic documents. More particularly, implementations of the present disclosure are directed to a machine learning platform for multi-matching (many-to-one matching, or one-to-many matching) of electronic documents.

In some implementations, actions include providing a set of column pairs, each column pair including a column of a bank statement table, and a column of a super invoice table, each column pair corresponding to a modality of a set of modalities, the super invoice table including at least one row including data associated with multiple invoices, for each column pair, determining a feature descriptor based on an operator on data in the column of the bank statement table, and data in the column of the super invoice table, a feature vector being provided based on feature descriptors of the set of column pairs, inputting the feature vector to a machine learning (ML) model that processes the feature vector to determine a probability of a match between the bank statement, and a super invoice represented by the super invoice table, and outputting a binary output representing one of a match and no match between the bank statement, and the super invoice based on the probability. Other implementations of this aspect include corresponding systems, apparatus, and computer programs, configured to perform the actions of the methods, encoded on computer storage devices.

These and other implementations can each optionally include one or more of the following features: the feature descriptor is provided based on an aggregation function over an output of the operator; the feature descriptor is provided from an encoder that corresponds to the modality; the set of modalities includes strings, numbers, categories, dates; a type of the operator for a column pair is determined based on a type of the columns in the column pair; the operator is a binary operator; and the super invoice table is generated from an invoice table by merging data of multiple rows of the invoice table to provide the at least one row of the super invoice table.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 2A depicts an example single-match graph, and an example multi-match graph.

FIG. 2B depicts the example single-match graph, and the example multi-match graph of FIG. 2A, each including a super node in accordance with implementations of the present disclosure.

FIG. 3A depicts example conversion of an example invoice table to an example super invoice table in accordance with implementations of the present disclosure.

FIG. 3B depicts example computation of an aggregate feature value in accordance with implementations of the present disclosure.

Like reference symbols in the various drawings indicate like elements.

DETAILED DESCRIPTION

Figure 1:
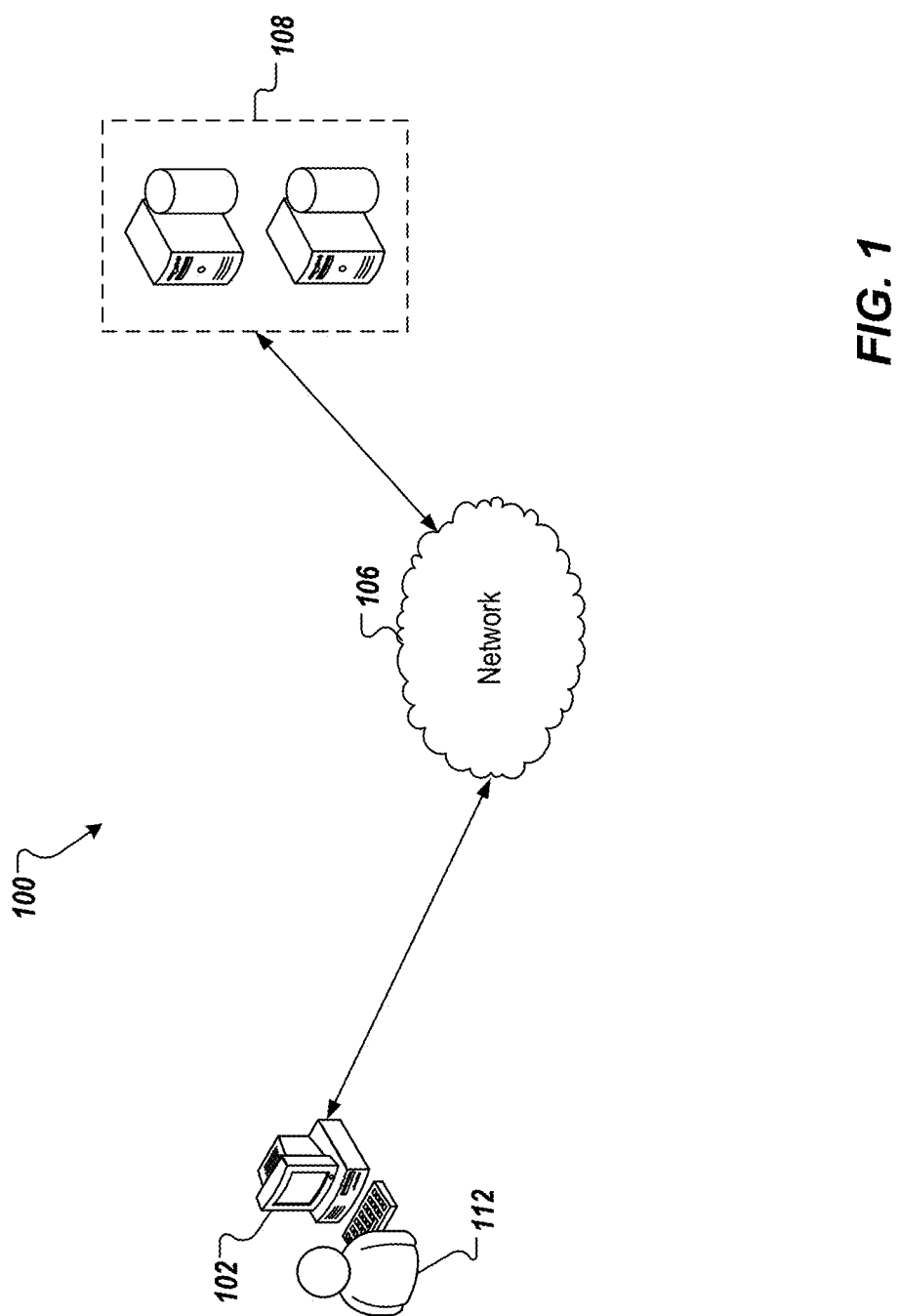
FIG. 1 depicts an example architecture that can be used to execute implementations of the present disclosure.

Implementations of the present disclosure are directed to matching electronic documents. More particularly, implementations of the present disclosure are directed to a machine learning platform for multi-matching (many-to-one matching, or one-to-many matching) of electronic documents. Implementations can include actions of providing a set of column pairs, each column pair including a column of a bank statement table, and a column of a super invoice table, each column pair corresponding to a modality of a set of modalities, the super invoice table including at least one row including data associated with multiple invoices, for each column pair, determining a feature descriptor based on an operator on data in the column of the bank statement table, and data in the column of the super invoice table, a feature vector being provided based on feature descriptors of the set of column pairs, inputting the feature vector to a machine learning (ML) model that processes the feature vector to determine a probability of a match between the bank statement, and a super invoice represented by the super invoice table, and outputting a binary output representing one of a match and no match between the bank statement, and the super invoice based on the probability.

To provide further context for implementations of the present disclosure, and as introduced above, machine learning can be used in a variety of problem spaces. An example problem space includes matching items of one entity to items of another entity. Examples include, without limitation, matching questions to answers, people to products, and bank statements to invoices. In many situations, it is required to match an item from one entity to a set of items from another. For example, it is possible for a customer to clear multiple invoices with a single payment, which can be referred to as a multi-match (many-to-one, or one-to-many), as opposed to a single-match (one-to-one). In many domains, existing approaches involve using a set of heuristics to group entities that are matched to a single entity. However, maintaining a set of heuristics can be unscalable when, for example, the patterns for matching items are numerous and variable.

In view of the above context, implementations of the present disclosure provide a machine learning approach to multi-matching (many-to-one matching, or one-to-many matching) of electronic documents. The machine learning approach of the present disclosure is scalable, and can account for matching of items that are numerous and variable.

Implementations of the present disclosure are described in further detail with reference to an example problem space that includes matching bank statements to invoices. More particularly, implementations of the present disclosure are described with reference to the problem of, given one bank statement (e.g., a computer-readable electronic document recording data representative of the bank statement), determining a set of invoices that the bank statement matches to (e.g., each invoice being a computer-readable electronic document recording data representative of the invoice). It is contemplated, however, that implementations of the present disclosure can be realized in any appropriate problem space.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a machine learning-based (ML-based) platform for multi-matching of electronic documents. That is, the server system 104 can receive computer-readable electronic documents (e.g., bank statements, invoices), and can match a single electronic document (e.g., a bank statement) to a set of electronic documents (e.g., a set of invoices).

In accordance with implementations of the present disclosure, and in the example problem space, the ML-based platform determines matches between a bank statement and a set of invoices. In particular, implementations of the present disclosure provide an entity that represents a set of invoices, referred to as a super invoice. Implementations of the present disclosure further provide an aggregate, pairwise feature engineering strategy that compares a bank statement against multiple invoices to provide a summarized feature descriptor. In some implementations, a multilayer perceptron is used to learn and infer matches between bank statements and super invoices. In some implementations, an automated feature learning model is provided based on deep learning algorithms to match bank statements to super invoices.

FIG. 2A depicts an example single-match graph 200, and an example multi-match graph 202. The single-match graph 200 includes a node representing a bank statement (BS) matched to a node representing an invoice (IV), the match being represented by an edge. The multi-match graph 202 includes a node representing a bank statement (BS) matched to a set of nodes, each node representing a respective invoice (IV), the matches being represented by respective edge. The examples of FIG. 2A depict traditional matching approaches. In such approaches, a machine learning pipeline can classify a relationship between a bank statement and an invoice among multiple categories: no match, single-match, and multi-match.

Implementations of the present disclosure, however, simplify this ternary classification problem by providing a super node that is representative of a set of entities. In the example context, the super node represents a so-called super invoice (SIV), an entity that represents a set of invoices. FIG. 2B depicts an example single-match graph 200', and an example multi-match graph 202' corresponding to the respective graphs of FIG. 2A. In FIG. 2B, each graph 200', 202' includes a super node in accordance with implementations of the present disclosure.

In accordance with implementations of the present disclosure, by abstracting multiple invoices as a set of invoices, the ML-based platform can guarantee that a single bank statement matches a single super invoice. In accordance with implementations of the present disclosure, there is no differentiation between single-matches and multi-matches, as both can be represented as super invoices. In other words, the ternary classification problem (labels=[{No Match, Single Match, Multi Match}) is reduced to a binary classification problem (labels={No Match, Match}).

In some implementations, each invoice is represented as a row of a tabular data structure with a set of fields. Example fields include, without limitation, invoice amount, invoice ID, date of creation, customer, due data). A super invoice follows a similar schema, except that each field contains a list of values rather than a single value.

FIG. 3A depicts example conversion of an example invoice table 300 to an example super invoice table 302 in accordance with implementations of the present disclosure. In this example, a set of invoices is represented in a single electronic document (e.g., the invoice table 300, the super invoice table 302). From the perspective of a table, it is guaranteed that each row of the super invoice table 302 belongs to at most one bank statement. In the example of FIG. 3A, shading of each invoice row represents a super invoice group that the respective invoice belongs to. The values of each field in the invoice table is converted to a list in the super invoice table. Further, one or more additional columns specific to super invoices are appended to the super invoice table (e.g., the total amount of the set of invoices in a row).

To match a bank statement to one or more rows of a super invoice table, implementations of the present disclosure provide aggregated pairwise feature engineering. More particularly, implementations of the present disclosure compute feature descriptors for pairs of bank statements, and super invoices. A feature descriptor can be described as the result of a transformation applied to some input data, which helps a ML model make a more accurate prediction. For matching bank statements to super invoices, binary operators can be applied to pairs of columns, one coming from each entity. Aggregation functions can be applied across the values computed for each invoice in the super invoice in order to compute a single value for a binary operation between a bank statement and a super invoice. Example aggregation functions include, without limitation, mean and standard deviation.

Table 1, below, provides examples of binary operators and the columns from the bank statement and super invoice tables they are applied to:

TABLE 1

Example Binary Operations

| BS Column | Operator | SIV Column |
|---|---|---|
| Amount | DIFF | Total Amount |
| Memo-line | AVG-CONTAINS | Reference Number |
| Memo-line | AVG-EDITDISTANCE | Reference Number |
| Memo-line | STD-EDITDISTANCE | Reference Number |
| Creation Date | AVG-DATEDIFF | Creation Date |
| Memo-line | AVG-CONTAINS | Customer Name |
| Memo-line | AVG-EDITDISTANCE | Customer Name |
| Currency | AVG-EQUALS | Currency |
| Reference Number | AVG-EQUALS | Reference Number |

In the operator column, the prefix refers to the aggregation function applied (AVG: average, STD: standard deviation).

Formally speaking, the i-th value in the feature descriptor d is computed by applying some binary operator f to a column b from the set of bank statement columns B and a column s from the set of super invoice columns S, followed by applying an aggregation function a to the resulting vector. This can be represented as:

$$d_i = a(f(b,s))$$

where $b \in B$, and $s \in S$.

In the example context, an intuitive benefit of pairwise feature functions is that it models the way a human accountant would compare bank statements and invoices. That is, when one is determining whether two items belong together, they are likely to compare certain pairs of columns, including the amounts, customers, ID fields, dates, and the like. Moreover, by aggregating these feature functions, the ML model is able to look at the bigger picture, rather than comparing a bank statement and an invoice independently. In this manner, the ML model is able to learn patterns from a more holistic perspective that includes the entire set of invoices in a multi-match by aggregating individual feature values.

FIG. 3B depicts example computation of an aggregate feature value in accordance with implementations of the present disclosure. In the example of FIG. 3B, the bank statement's memo line, which is a free text field (e.g., containing information about the payment), contains a typo (e.g., GH* instead of GHI). If the binary operators are computed independently for each BS-IV pair, as in traditional approaches, the last invoice (with reference number GHI) is not likely to be matched to the bank statement. However, the feature engineering of the present disclosure enables computation of a higher aggregated feature score. This example portrays how aggregating pairwise feature functions can help the ML model match a bank statement to a super invoice even when information is imperfect.

After feature descriptors are determined, as described herein, a multilayer perceptron is trained to learn, and subsequently predict matches between bank statements and super invoices. In some implementations, the multilayer perceptron is provided as a deep learning model that operates on one-dimensional vector inputs. In some examples, each layer of the multilayer perceptron computes a linear transformation and subsequently applies an activation transformation. In some examples, the activation transformation is provided as a non-linear, differentiable function. The output of the model can either be a regression, or normalized probabilities for classification tasks. In accordance with implementations of the present disclosure, the output is a softmax activation that computes the probability of the relationship between a BS-SIV pair being either a no-match, or a match. This is represented as:

$$P(\text{Match} \mid x) = \frac{e^{Z_{Match}}}{e^{Z_{NoMatch}} + e^{Z_{Match}}}$$

where x is the input feature vector computed using a pair of bank statement and super invoice [BS-SIV], z is the output of the final linear transformation in the multilayer perceptron, and e is the exponential function.

In some implementations, the multilayer perceptron includes an input layer, one or more hidden layers, and an output layer. Each layer includes a set of neurons, each neuron computing some linear transformation of its inputs. In some examples, a non-linear activation function is provided at the end of each layer.

Deep learning algorithms, and models, such as the multilayer perceptron, have shown impressive performances across multiple domains including computer vision, natural language processing, and speech recognition. One of the perceived drawbacks of deep learning, however, is the lack of ability to adapt to inputs containing multiple modalities (e.g. tabular data structures including text, categorical, and numerical data). However, by applying the aggregated pairwise feature functions, implementations of the present disclosure transform each pair of bank statements and super invoices to a feature descriptor with continuous values. This enables the multilayer perceptron to effectively learn to match bank statements and super invoices.

Further, the pairwise feature functions described herein include string edit distance computations, which are on the order of $O(n^2)$. Moreover, a string edit distance is determined for each pair of bank statements and super invoices, the total complexity becomes $O(b*s*n^2)$, where b and s are the number of bank statements and super invoices, respectively, and n is the average length of a string. A benefit of a full deep learning pipeline in accordance with implementations of the present disclosure is the reduction in computational complexity. This is achieved by entirely removing pairwise feature computations. In particular, the bank statement and super invoice columns are split into separate, respective modalities, and respective encoders are applied to each type of data. In other words, implementations of the present disclosure provide encoders for strings, floats, categories, and dates, respectively.

Figure 4:
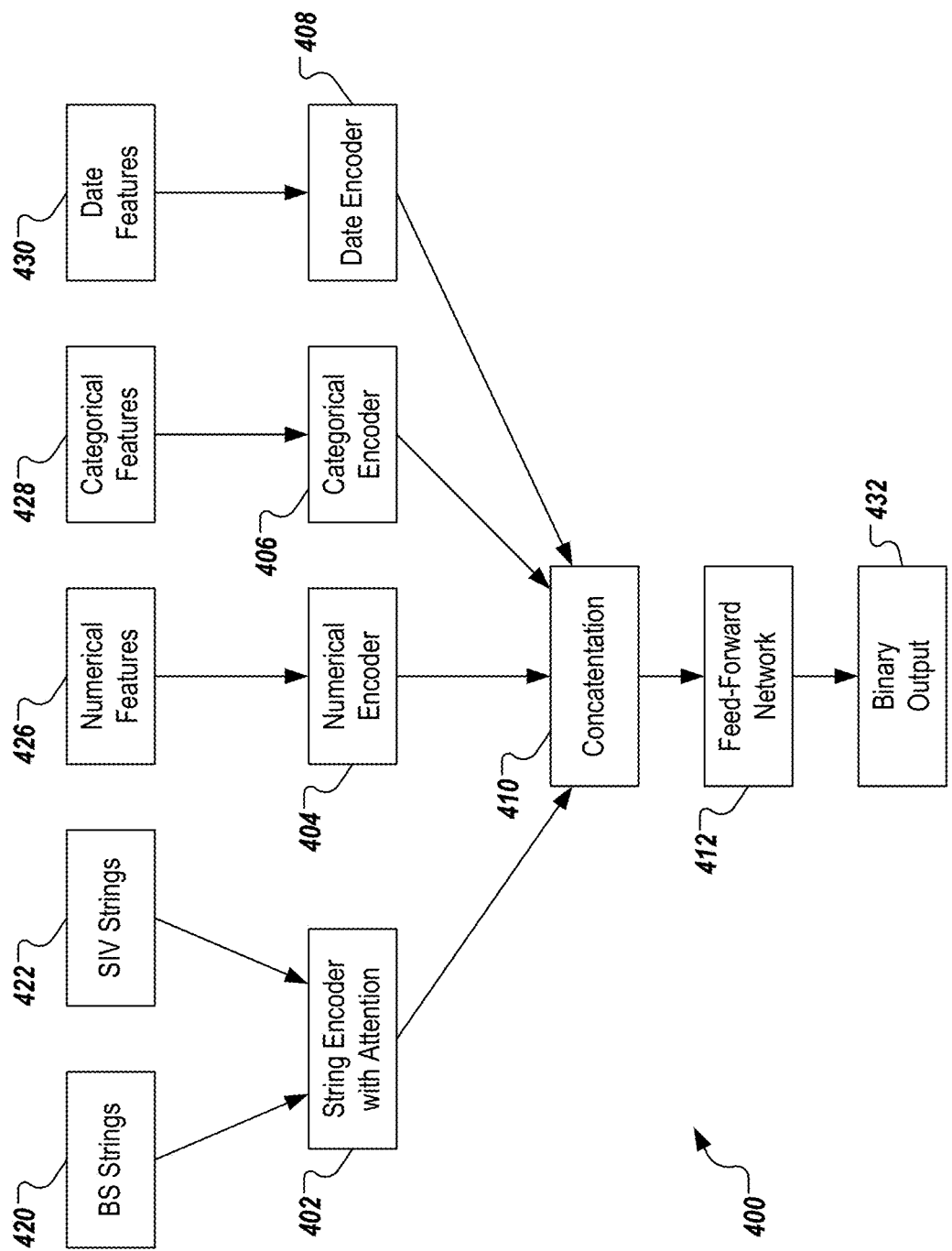
FIG. 4 depicts an example conceptual architecture of an end-to-end deep learning model in accordance with implementations of the present disclosure.

FIG. 4 depicts an example conceptual architecture 400 of an end-to-end deep learning model in accordance with implementations of the present disclosure. The example conceptual architecture includes a string encoder 402, a numerical encoder 404, a categorical encoder 406, a date encoder 408, a concatenation module 410, and a feed-forward network 412. The string encoder 402 receives input including bank statement strings 422, and super invoice strings 422, the numerical encoder 426 receives input including numerical features 426, the categorical encoder 406 receives input including categorical features, and the date encoder 408 receives input including date features 420. Accordingly, each of the inputs corresponds a respective type of column from the bank statements and super invoices.

In some examples, the string encoder 402 uses attention matrices for encoding string features from the bank statements and the super invoices. The attention matrices are able to automatically learn, which string features in the bank statement are relevant for matching with certain sections of the super invoices, and vice-versa. In some examples, the string encoder with attention produces an intermediate output which is a function of the textual descriptions of a pair of bank statement and set of invoices. The attention portion of the encoder finds relevant text in the bank statement, which relates to certain fields in the invoice (e.g. some invoice ID in the bank statement's text fields) and vice versa.

Each encoder transforms and projects its respective input to some latent dimension, the same latent dimension being output by all encoders. The concatenation of all of the latent projections (e.g., a feature vector embedding the document as a 128-dimensional vector) by the concatenation module 410 are fed into the feed-forward network 412. The feed-forward network 412 provides a binary logistic output, which indicates whether the given bank statement and super invoice match.

In accordance with implementations of the present disclosure, by employing encoders for feature learning, instead of relying on string edit distance for feature engineering, the time complexity is reduced to $O(b*s*n^2)$, where n is the length of an embedding for character convolution in the string encoder layer, as described above. Consequently, the end-to-end deep learning model of the present disclosure is a viable solution to matching bank statements to super invoices, especially is cases of computing resource constraints.

Figure 5:
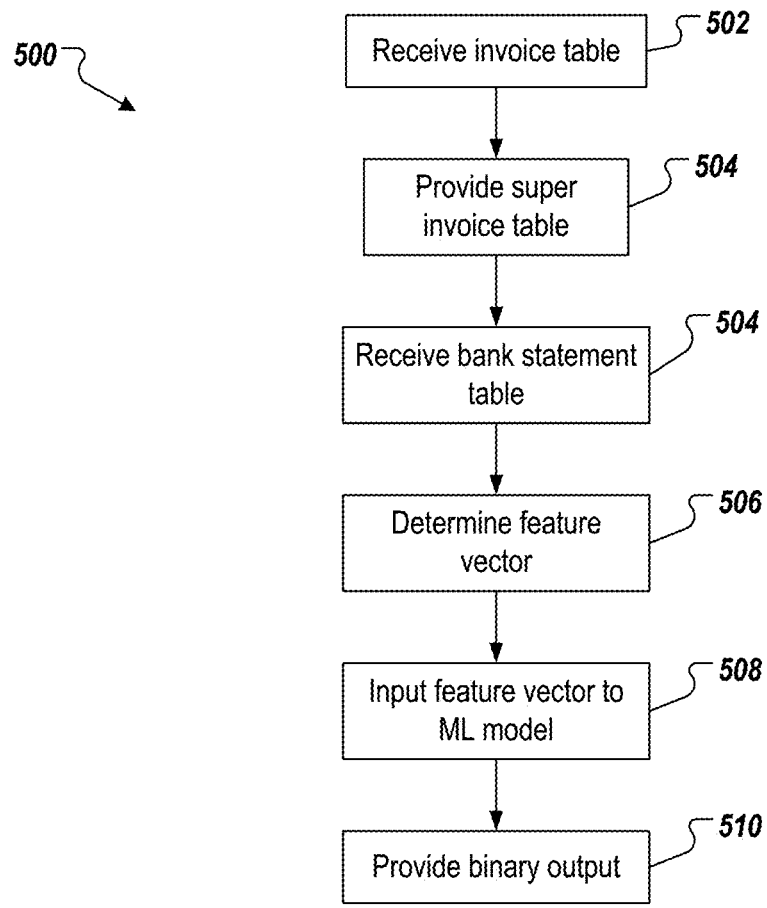
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

An invoice table is provided (502). For example, an electronic document including data representative of a table of invoices is provided from computer-readable memory (e.g., a database). In some examples, and as depicted in FIG. 3A, the invoice table includes a plurality of rows, each row corresponding to an invoice. A super invoice table is provided (504). For example, and as depicted in FIG. 3B, rows of the invoice table are merged to provide at least one row corresponding to two or more invoices. In some examples, a column is inserted (e.g., Total Amount). A bank statement table is provided (506). For example, an electronic document including data representative of a bank statement is provided from computer-readable memory (e.g., a database). In some examples, the bank statement table includes a plurality of rows, each row corresponding to payment of an invoice.

A feature vector is determined (508). For example, and as described in detail above, the bank statement and super invoice columns are split into separate, respective modalities (e.g., strings, numbers, categories, dates), and respective encoders are applied to each type of data. In some examples, the encoders calculate a feature descriptor by applying an operator in comparing a bank statement column to an invoice column for a respective modality. In some examples, the operator is a binary operator (e.g., 1 if matching, 0, if not matching). The feature descriptors are combined to provide a feature vector. The feature vector is input to a ML model (510). In some examples, the ML model processes the feature vector, as described herein, to determine a probability of a match between the bank statement and the super invoice.

A binary output is provided (512). For example, the ML model provides an output indicating whether the bank statement matches the super invoice (e.g., label=Match, or label=No Match). In some examples, the binary output is determined based on comparing the probability to a threshold probability. In some examples, if the probability exceeds the threshold probability, the binary output is provided as match. Otherwise, the binary output is provided as no match.

Figure 6:
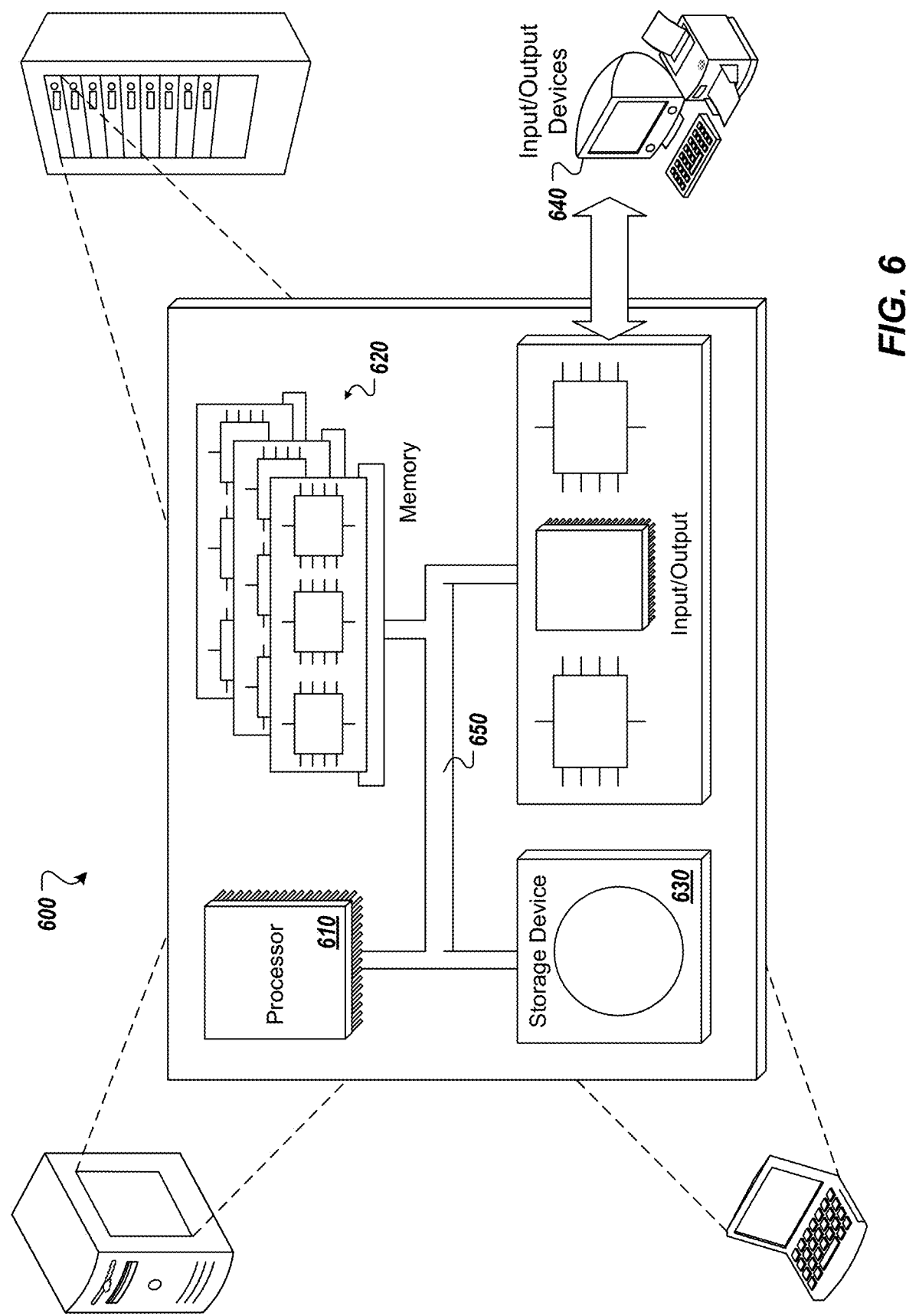
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for matching bank statements to invoices, the method being executed by one or more processors and comprising:

defining a super invoice table based on multiple invoices enumerated in distinct rows of an invoice table, the super invoice table comprising at least one row comprising data associated with the multiple invoices provided in the distinct rows of the invoice table, the data at least partially comprising a tuple of multiple identifiers in a first cell of the at least one row, each identifier uniquely identifying a respective invoice of the invoice table, and a total in a second cell of the at least one row, the total comprising a sum of invoices identified in the tuple of multiple identifiers, the second cell located within an additional column specific to the super invoice table relative to the invoice table, each row of the super invoice table being matchable to at most one bank statement;

providing a set of column pairs, each column pair comprising a column of a bank statement table, and a column of a super invoice table, each column pair corresponding to a modality of a set of modalities;

for each column pair, determining a feature descriptor based on an operator on data in the column of the bank statement table, and data in the column of the super invoice table, the data comprising a combination of data from each invoice of the multiple invoices in the invoice table, and a feature vector being provided based on feature descriptors of the set of column pairs, the operator being selected from a plurality of operators based on a data type of the column pair, the feature descriptor comprising an aggregation enabling matching in an event that data of the super invoice table is inaccurate;

inputting the feature vector to a machine learning (ML) model that processes the feature vector to determine a probability of a match between the bank statement, and a super invoice represented by the super invoice table; and outputting a binary output representing one of a match and no match between the bank statement, and the super invoice based on the probability.

2. The method of claim 1, wherein the feature descriptor is provided based on an aggregation function over an output of the operator.

3. The method of claim 1, wherein the feature descriptor is provided from an encoder that corresponds to the modality.

4. The method of claim 1, wherein the set of modalities comprises strings, numbers, categories, dates.

5. The method of claim 1, wherein a type of the operator for a column pair is determined based on a type of the columns in the column pair.

6. The method of claim 1, wherein the operator is a binary operator.

7. The method of claim 1, wherein the super invoice table is generated from the invoice table by merging data of multiple rows of the invoice table to provide the at least one row of the super invoice table.

8. A non-transitory computer-readable storage medium coupled to one or more processors and having instructions stored thereon which, when executed by the one or more processors, cause the one or more processors to perform operations for matching bank statements to invoices, the operations comprising:
  defining a super invoice table based on multiple invoices enumerated in distinct rows of an invoice table, the super invoice table comprising at least one row comprising data associated with the multiple invoices provided in the distinct rows of the invoice table, the data at least partially comprising a tuple of multiple identifiers in a first cell of the at least one row, each identifier uniquely identifying a respective invoice of the invoice table, and a total in a second cell of the at least one row, the total comprising a sum of invoices identified in the tuple of multiple identifiers, the second cell located within an additional column specific to the super invoice table relative to the invoice table, each row of the super invoice table being matchable to at most one bank statement;
  providing a set of column pairs, each column pair comprising a column of a bank statement table, and a column of a super invoice table, each column pair corresponding to a modality of a set of modalities;
  for each column pair, determining a feature descriptor based on an operator on data in the column of the bank statement table, and data in the column of the super invoice table, the data comprising a combination of data from each invoice of the multiple invoices in the invoice table, and a feature vector being provided based on feature descriptors of the set of column pairs, the operator being selected from a plurality of operators based on a data type of the column pair, the feature descriptor comprising an aggregation enabling matching in an event that data of the super invoice table is inaccurate;
  inputting the feature vector to a machine learning (ML) model that processes the feature vector to determine a probability of a match between the bank statement, and a super invoice represented by the super invoice table; and
  outputting a binary output representing one of a match and no match between the bank statement, and the super invoice based on the probability.

9. The computer-readable storage medium of claim 8, wherein the feature descriptor is provided based on an aggregation function over an output of the operator.

10. The computer-readable storage medium of claim 8, wherein the feature descriptor is provided from an encoder that corresponds to the modality.

11. The computer-readable storage medium of claim 8, wherein the set of modalities comprises strings, numbers, categories, dates.

12. The computer-readable storage medium of claim 8, wherein a type of the operator for a column pair is determined based on a type of the columns in the column pair.

13. The computer-readable storage medium of claim 8, wherein the operator is a binary operator.

14. The computer-readable storage medium of claim 8, wherein the super invoice table is generated from the invoice table by merging data of multiple rows of the invoice table to provide the at least one row of the super invoice table.

15. A system, comprising:
  a computing device; and
  a computer-readable storage device coupled to the computing device and having instructions stored thereon which, when executed by the computing device, cause the computing device to perform operations for matching bank statements to invoices, the operations comprising:
    defining a super invoice table based on multiple invoices enumerated in distinct rows of an invoice table, the super invoice table comprising at least one row comprising data associated with the multiple invoices provided in the distinct rows of the invoice table, the data at least partially comprising a tuple of multiple identifiers in a first cell of the at least one row, each identifier uniquely identifying a respective invoice of the invoice table, and a total in a second cell of the at least one row, the total comprising a sum of invoices identified in the tuple of multiple identifiers, the second cell located within an additional column specific to the super invoice table relative to the invoice table, each row of the super invoice table being matchable to at most one bank statement;
    providing a set of column pairs, each column pair comprising a column of a bank statement table, and a column of a super invoice table, each column pair corresponding to a modality of a set of modalities;
    for each column pair, determining a feature descriptor based on an operator on data in the column of the bank statement table, and data in the column of the super invoice table, the data comprising a combination of data from each invoice of the multiple invoices in the invoice table, and a feature vector being provided based on feature descriptors of the set of column pairs, the operator being selected from a plurality of operators based on a data type of the column pair, the feature descriptor comprising an aggregation enabling matching in an event that data of the super invoice table is inaccurate;
    inputting the feature vector to a machine learning (ML) model that processes the feature vector to determine a probability of a match between the bank statement, and a super invoice represented by the super invoice table; and
    outputting a binary output representing one of a match and no match between the bank statement, and the super invoice based on the probability.

16. The system of claim 15, wherein the feature descriptor is provided based on an aggregation function over an output of the operator.

17. The system of claim 15, wherein the feature descriptor is provided from an encoder that corresponds to the modality.

18. The system of claim 15, wherein the set of modalities comprises strings, numbers, categories, dates.

19. The system of claim 15, wherein a type of the operator for a column pair is determined based on a type of the columns in the column pair.

20. The system of claim 15, wherein the operator is a binary operator.

* * * * *